United States Patent
Marsland

(10) Patent No.: US 7,158,972 B2
(45) Date of Patent: Jan. 2, 2007

(54) METHODS AND APPARATUS FOR MANAGING MULTIPLE USER SYSTEMS

(75) Inventor: Timothy Marsland, Half Moon Bay, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 414 days.

(21) Appl. No.: 10/302,008

(22) Filed: Nov. 21, 2002

(65) Prior Publication Data

US 2003/0110173 A1 Jun. 12, 2003

Related U.S. Application Data

(60) Provisional application No. 60/340,585, filed on Dec. 11, 2001.

(51) Int. Cl.
G06F 17/30 (2006.01)
G06F 15/16 (2006.01)

(52) U.S. Cl. ............... 707/10; 707/201; 709/216; 709/226

(58) Field of Classification Search ............ 707/10, 707/201; 709/216, 226; 711/153, 173; 713/1; 718/1, 100, 105
See application file for complete search history.

(56) References Cited

U.S. PATENT DOCUMENTS

| | | | | |
|---|---|---|---|---|
| 6,173,293 | B1 * | 1/2001 | Thekkath et al. | 707/201 |
| 6,438,573 | B1 * | 8/2002 | Nilsen | 718/100 |
| 2002/0087611 | A1 * | 7/2002 | Tanaka et al. | 709/1 |
| 2002/0087854 | A1 * | 7/2002 | Haigh et al. | 713/1 |
| 2002/0107914 | A1 * | 8/2002 | Charisius et al. | 709/203 |

OTHER PUBLICATIONS http://www.britannica.com/ebc/article-9374062?query=operating%20system&ct= Definition for operating system from Encyclopeida Brittanica Online, printed Aug. 22, 2005, pp. 1 of 3.*
http://www.britannica.com/ebc/article-9360963?query=client&ct= Definition for client from Encyclopedia Britannica Online, printed Aug. 22, 2005, pages 1 of 3.*
Govil, Kinshuk, et al., "Cellular Disco: resource management using virtual clusters on shared-memory multiprocessors," 17th ACM Symp. On Operating Systems Principles (SOS'99), Dec. 1999, pp. 154-169.
—, "Serving Diskless Workstations," AIX Versions 3.2 and 4 Perfomance Tuning Guide, 5th Edition, 1996, pp. 1-10. [website: www.nscp.upenn.edu/aixbman4.3html].

* cited by examiner

Primary Examiner—Jeffrey Gaffin
Assistant Examiner—Hassan Mahmoudi
(74) Attorney, Agent, or Firm—Dorsey & Whitney LLP

(57) ABSTRACT

The techniques of the present invention relate to allocating resources and managing multiple services and multiple users in a multiprocessing computer system. A virtual machine executive is booted on a computer system typically with multiple processors and multiple memory blocks. The virtual machine executive creates multiple virtual machines associated with multiple operating systems. A virtual machine executive provides the illusion that each virtual machine has its own dedicated hardware. The virtual machine executive either behaves as a file server, or hosts an operating system instance that behaves as a file server. System administration of the collection of operating system instances can be achieved by administering the operating system instance that behaves as a file server, rather than by administering each operating system instance alone.

10 Claims, 5 Drawing Sheets

METHODS AND APPARATUS FOR MANAGING MULTIPLE USER SYSTEMS

CROSS REFERENCE TO RELATED APPLICATION

The present application claims priority from U.S. Provisional Patent Application No. 60/340,585 for METHODS AND APPARATUS FOR MANAGING MULTIPLE USER SYSTEMS filed on Dec. 11, 2001 by Tim Marsland, the entirety of which is incorporated herein by reference for all purposes.

BACKGROUND OF THE INVENTION

1. Field of Invention

The present invention relates generally to multiple user systems. More particularly, the present invention relates to effective resource allocation and administration on multiple user systems.

2. Description of the Related Art

Individual computer systems have been used to support multiple clients in a variety of different environments. These individual computer systems typically have multiple processors that share a single physical address space. However, operating systems fully benefiting from the resources available in a single computer system have been difficult to develop. Often times, the resources such as processing and memory resources available in a multiple user computer system are difficult to allocate effectively to each of the various services and users of the system. Cellular Disco is one technique for partitioning a multiple user system. Cellular Disco is described in *Cellular Disco: Resource Management Using Virtual Clusters On Shared-Memory Multiprocessors*, Operating Systems Review 34(5):154–169, December 1999, the entirety of which is incorporated by reference for all purposes.

A virtual machine executive runs on top of the computer system hardware and creates multiple instances of one or more operating systems by running each instance inside its own virtual machine. That is, Cellular Disco is an architecture that allows the creation of multiple virtual machines associated with multiple instances of an operating system. More generally, each virtual machine and associated operating system instance can be allocated one or more virtual CPUs and a predetermined amount of memory. Each operating system can then run as though it had its own computer system hardware, even though it may only have access to some smaller portion of the physical resources of the machine.

However, because of the independence of the various operating system instances, each operating system instance has its own set of administration and system maintenance issues. As an example, when a system administrator seeks to install a new application on a set of computer systems, the system administrator typically needs to install the new application on each operating system instance. If a single computer system has a virtual machine executive that creates five virtual machines and associated operating system instances, the system administrator has to install the new application on each of the five operating system instances even though there is actually only a single underlying physical computer system.

Consequently, it is desirable to provide improved techniques for managing resources and administering system services and applications on the set of operating systems hosted by a virtual machine executive.

SUMMARY OF THE INVENTION

The techniques of the present invention relate to allocating resources and managing multiple services and multiple users in a multiprocessing computer system. A virtual machine executive is booted on a computer system typically with multiple processors and multiple memory blocks. The virtual machine executive creates multiple virtual machines associated with multiple operating systems. A virtual machine executive provides the illusion that each virtual machine has its own dedicated hardware. The virtual machine executive either behaves as a file server, or hosts an operating system instance that behaves as a file server. System administration of the collection of operating system instances can be achieved by administering the operating system instance that behaves as a file server, rather than by administering each operating system instance alone.

According to various embodiments, a computer system is provided. The computer system includes a virtual machine executive, a first operating system, and a second operating system. The virtual machine executive runs on resources including a processor, memory, and persistent storage. The virtual machine executive is configured to allocate resources for a plurality of virtual machines. The first operating system is created by the virtual machine executive. The first operating system operates as a file server. A second operating system is created by the virtual machine executive. The second operating system operates as a file server client. The second operating system accesses data in persistent storage through the first operating system.

According to another embodiment, a virtual machine executive is provided. The virtual machine executive includes a virtual machine interface, a virtual network, and a resource allocator. The virtual machine interface supports a first operating system running as a file server and a second operating system running as a diskless file server client. A virtual network is configured to allow data access requests from the file server client to the file server. A resource allocator is configured to track the number of data access requests from the first operating system to allow the virtual machine executive to vary resource allocation for the first operating system.

According to still other embodiments, a method for administering clients is provided. The method includes booting a file server image on a computer system including a virtual machine executive and a plurality of virtual machines, wherein the computer system uses a single physical address space, starting a file server client on the computer system, and providing a network interface for the file server client to communicate with the file server. The file server client permits administration through the network interface by using the file server image.

Another aspect of the invention pertains to computer program products including a machine readable medium on which is stored program instructions, tables or lists, and/or data structures for implementing a method as described above. Any of the methods, tables, or data structures of this invention may be represented as program instructions that can be provided on such computer readable media.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF THE EMBODIMENTS

The techniques of the present invention provide methods and apparatus for improving the efficiency of resource allocation in a multiple user computer system while limiting the administrative burden of handling multiple users. Prior art multiple user systems were typically rigid in terms of resource allocation. In various network file system architectures, the network file server would be the access point for all disk data access requests. Network file server clients would typically include a processor and memory but would often not include substantial disk space other than that which could be used for swap space. Each network file server client would access information and disk through the network file server. However, each network file server client had fixed resources. Each network file server client included a set amount memory and a given number of processors. If a network file server client needed additional resources, none could be effectively allocated to the network file server client.

The techniques of the present invention provide a virtual machine executive running on a single computer system typically with multiple processors and multiple memory blocks. Instead of creating multiple independent instances of one or more operating systems on top of the virtual machine executive, operating systems and associated virtual machines can be created as file servers and file server clients running a protocol such as a network file server protocol or a block level protocol. By creating network file servers and network file server clients on top of a virtual machine executive, resource allocation can efficiently and effectively be provided to the various users. Furthermore, a single point of administration is available at the network file server. The system administrator wishing to install or update an application can install or update a single copy at the network file server. The network file server clients can then access the network file server for the new or updated copy of the application. The system administrator no longer needs to install a new copy of the application on every operating system supported by the virtual machine executive.

The system administrator can also have knowledge of the exact images of the operating systems launched by the virtual machine executive. Resources can be allocated and reallocated based on factors such as demand, load, and priority. In one example, data access requests to a network file server can be monitored. Information about the data access requests can be used to vary the resource allocation. In this example, a file server client making 25% of the data access requests could be allocated 25% of the resources.

Figure 1:
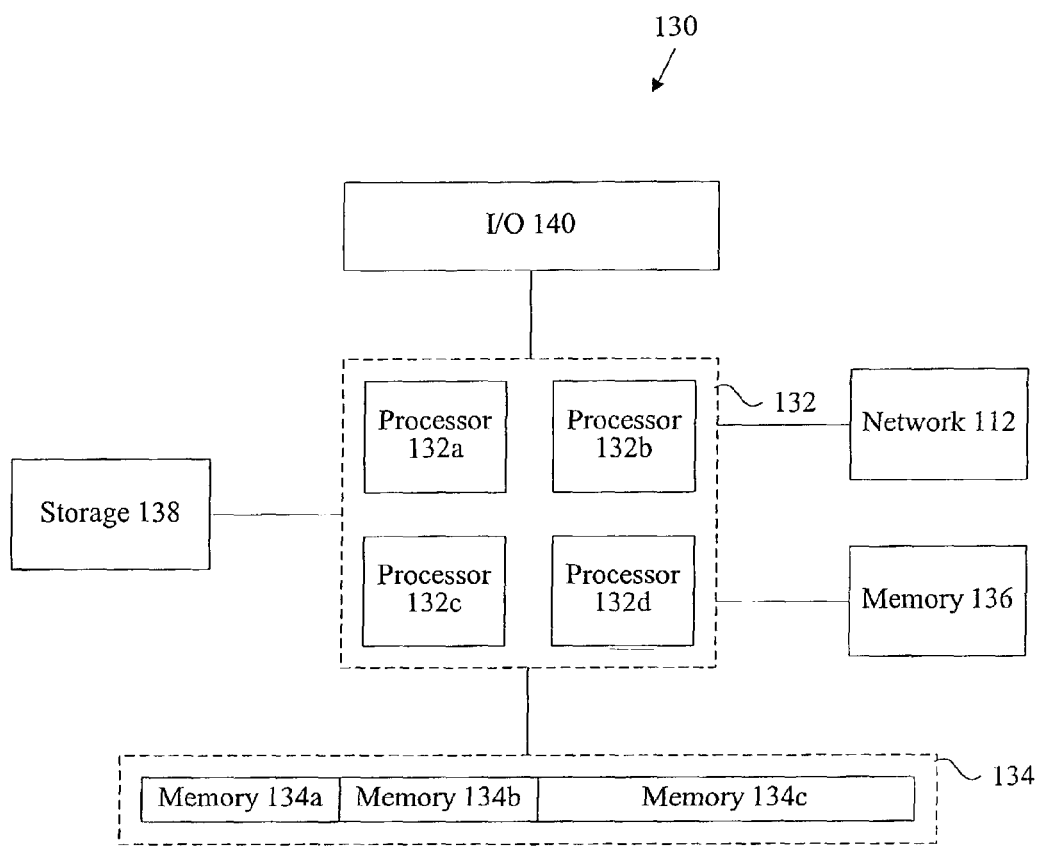
FIG. 1 is a diagrammatic representation of a computer system that can use the techniques of the present invention.

FIG. 1 illustrates a typical, general-purpose computer system suitable for implementing the present invention. The computer system 130 includes a processor block 132 that can including one or more processors such as processors 132a–d. The processors 132a–d (also referred to as central processing units, or CPUs) are coupled to memory devices including primary storage devices 136 (typically a read only memory, or ROM) and primary storage devices 134 (typically a random access memory, or RAM). The primary storage devices 134 may include memory that can be partitioned into a plurality of blocks 134a–c.

Computer system 130 or, more specifically, CPUs 132, may be arranged to support a virtual machine executive. One example of a virtual machine executive that may be supported on computer system 130 will be described below with reference to FIG. 2. As will be appreciated by one of skill in the art, ROM connected to CPUs 132 can act to transfer data and instructions uni-directionally to the CPUs 132, while RAM can be used to transfer data and instructions in a bi-directional manner. CPUs 132 may generally include any number of processors. Both primary storage devices 134 and 136 may include any suitable computer-readable media. A secondary storage medium 138, which is typically a mass memory device, is also coupled bi-directionally to CPUs 132 and provides additional data storage capacity.

The mass memory device 138 is a computer-readable medium that may be used to store programs including computer code, data, and the like. Typically, mass memory device 138 is a storage medium such as a hard disk or a tape which is generally slower than primary storage devices 134, 136. Mass memory storage device 138 may take the form of a magnetic or paper tape reader, solid state memory, or some other form of persistent storage. When a mass memory device is used, a controller such as a disk controller for driving the device can also be provided. It will be appreciated that the information retained within the mass memory device 138, may, in appropriate cases, be incorporated in standard fashion as part of RAM 136 as virtual memory. A specific primary storage device 134 such as a CD-ROM may also pass data uni-directionally to the CPUs 132.

CPUs 132 are also coupled to one or more input/output devices 140 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. According to various embodiments, input/output devices 140 support multiple users. That is, several monitors, several keyboards, etc. can be used by different users at the same time to use system resources including CPUs 132. Finally, CPUs 132 optionally may be coupled to a computer or telecommunications network, e.g., an internet network or an intranet network, using a network connection as shown generally at 112.

With such a network connection, it is contemplated that the CPUs 132 might receive information from the network, or might output information to the network in the course of performing the above-described method steps. Such information, which is often represented as a sequence of instructions to be executed using CPUs 132, may be received from and outputted to the network, for example, in the form of a computer data signal embodied in a carrier wave. The above-described devices and materials will be familiar to those of skill in the computer hardware and software arts.

It should be noted that although many of the components may be provided in a computer system as distinct devices, integrated components supported on a single chip or device are also contemplated. In one example, all forms of memory and storage may be located on a single chip with the various processors 132.

Figure 2:
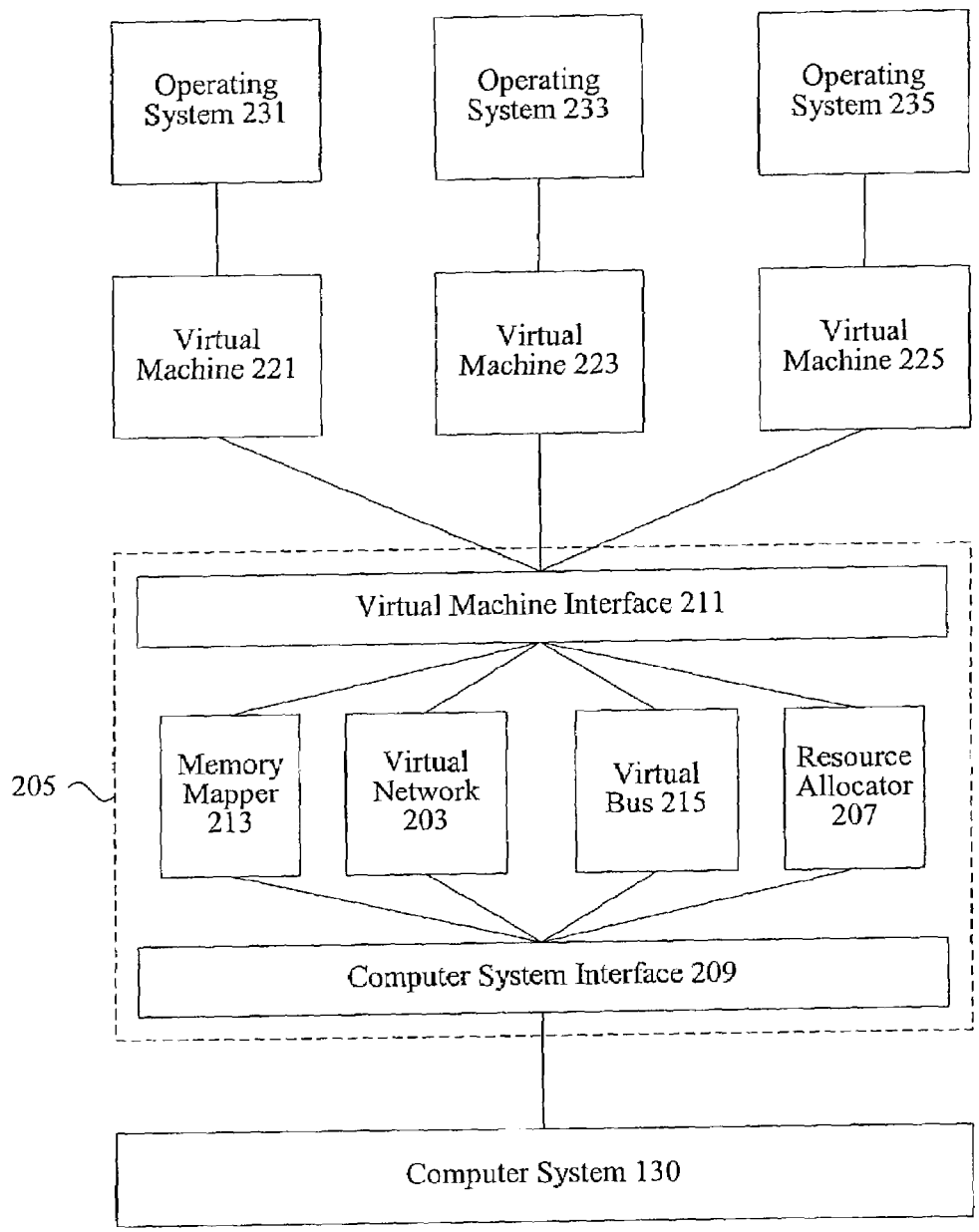
FIG. 2 is a diagrammatic representation of a multiple user virtual machine executive architecture.

As noted above, a virtual machine executive can run on a computer system such as the multiprocessor system 130 shown in FIG. 1. FIG. 2 is a diagrammatic representation showing a virtual machine executive 205 running on top of a computer system 130 that allows a plurality of virtual machines to be created. The virtual machine executive 205 can include a virtual machine interface 211, a memory mapper 213, a virtual network 203, a resource allocator 207, and a computer system interface 209. Generally, a virtual machine executive provides an abstraction for a collection of physical hardware such as the hardware in computer system 130. The virtual machine executive 205 can partition resources such as memory, I/O devices, and processors for various virtual machines by using a resource allocator 207.

Resources may be partitioned before or after the various operating systems running on top of the virtual machine executive are booted. Resource partitions can also be updated dynamically at any time. In one example, a virtual machine executive 205 can allocate processor 132a and a memory block 134a for a first supported virtual machine. The virtual machine executive can then allocate processors 132b and 132c and memory block 134b for running a second virtual machine. The resource allocator 207 allows the sharing of processors and other resources between multiple operating system instances running on a single collection of hardware. A conventional system with some virtual machine executive characteristics is IBM's VM operating system executive, CP, which allowed multiple CMS and MVS instances to run on a single computer system with a shared address space partitioned as separate virtualized system/370 platforms.

To allow partitioning of a computer system 130 into separate, virtualized platforms, the virtual machine executive 205 also includes a computer system interface 209. The computer system interface 209 allows the virtual machine executive to communicate with the actual physical hardware. In one implementation, the computer system interface 209 can include device drivers for communicating with various peripherals in the computer system 130. In another implementation, the computer system interface 209 may not include device drivers and may merely map instructions issued by a virtual machine device driver to a computer system device. One tool for mapping instructions is the memory mapper 213. Another implementation translates instructions issued on a mapped virtual device into a different set of instructions issued on a physical device to enable complete emulation of physical devices. The virtual machine executive 205 can provide separate memory address spaces for various virtual machines. Some memory address spaces may be private while others may be shared. When an operating system instance running on a virtual machine 221 attempts to write to a particular address, the memory mapper 213 maps the address to an actual physical address in computer system 130. It should be noted, that a virtual machine 221 may also include memory mapping mechanisms. The memory mapping mechanisms may be similar to the ones used in the virtual machine executive.

According to various embodiments, virtual machine executive 205 can include a virtual bus 215. The virtual machines 221, 223, and 225 can access the computer system 130 through a virtual bus 215. The virtual bus 215 can be used to allow each virtual machine to act as a diskful system. That is, each virtual machine can believe that it has direct access to one or more local disks or storage devices. It should be noted that a diskful system can use not only local disks or storage devices, but can also use remote or network disks and storage devices. Note that some virtual machine embodiments allow an operating system direct access to a physical bus and the physical devices on that bus. An operating system that has direct access to a persistent storage device either via a physical or virtual bus, is referred to herein as a diskful system. In one example, an operating system 231 can access a persistent storage mechanism such as a hard disk through a virtual machine 221 and a virtual machine executive 205.

A virtual machine executive 205 can support not only diskful systems but can also support diskless systems. An operating system that relies on another operating system for access to persistent storage is referred to as a diskless system. In one embodiment, a diskless system can be running a network file server protocol. Instead of accessing persistent storage directly through a virtual bus 215, a diskless operating system can access data through a network file server using a virtual network 203. In one embodiment, a diskless instance could boot via a physical network device attached to the physical bus. The virtual network 203 can allow supported virtual machines such as virtual machine 221 and virtual machine 223 to communicate across the virtual machine executive as though the virtual machine executive provided a network interface. In one example, the virtual network 203 allows the virtual machine 221 to communicate with a virtual machine 223 using a network file server protocol such as NFS. In another example, the virtual network 203 allows the virtual machine 221 to communicate with a virtual machine 223 using a block level protocol such as iSCSI. In each case, the virtual machine 221 or virtual machine 223 can send signals to the virtual machine interface 211 of the virtual machine executive 205 as though the virtual machine executive was the network interface for using a network file server protocol or a block level protocol.

There are several benefits to running operating systems as diskless systems on top of a virtual machine executive. One benefit is increased administrative efficiency. In order to update various applications or to change the configuration of various diskless machines using a virtual machine executive, a system administrator can alter a single network file server instead of each individual operating system. In one example, operating system 231 and operating system 233 may be running as network file server clients. An operating system 235 may be running as a network file server. To update the version of a particular application, a system administrator may elect to change only the network file server. By contrast, a virtual machine executive running separate diskful operating systems may require a system administrator to change every copy of the application running on every operating system.

Running diskless systems on top of a virtual machine executive also provides benefits over conventional network file systems such as NFS based networks. By using a virtual machine executive, resources can be partitioned efficiently either statically or dynamically. Conventional network file systems used separate computer systems each with their own processor and memory resources that could not be allocated effectively based on demand. Here, a virtual machine executive on top of a single computer system with processor and memory resources can be partitioned effectively based on factors such as demand while still allowing the administrative efficiency of a network file system protocol.

Figure 3:
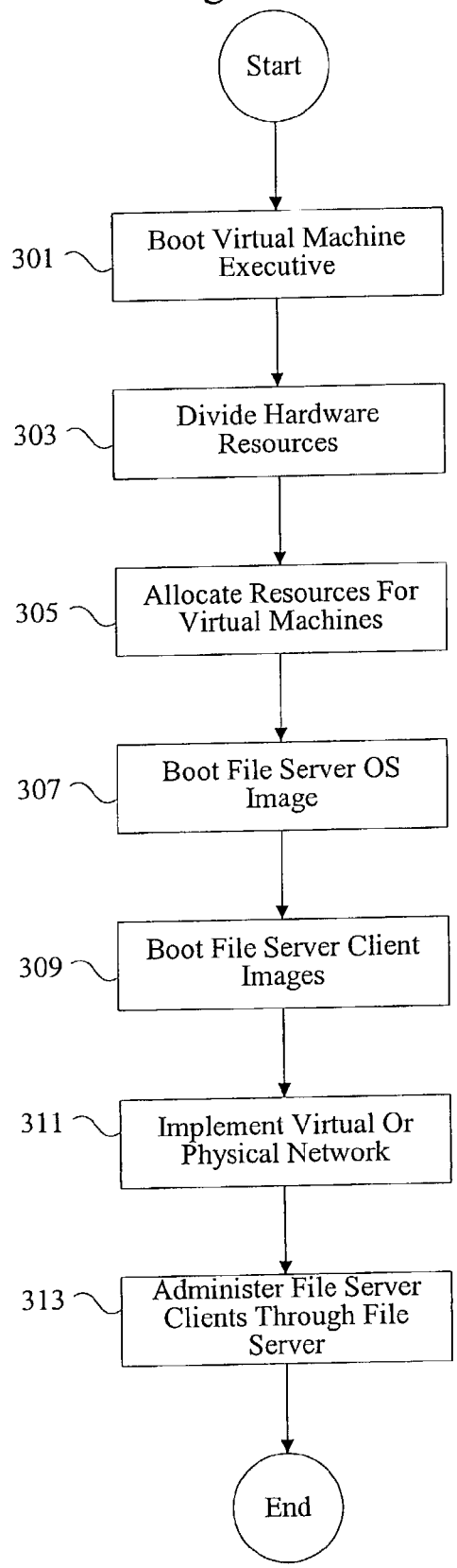
FIG. 3 is a process flow diagram showing a method for administrating diskless file server clients.

FIG. 3 is a process flow diagram showing the implementation of a virtual machine executive showing one example of administration of multiple diskless clients. At 301, the virtual machine executive can be booted using information from memory such as ROM. The virtual machine executive at 303 then divides hardware resources. According to various embodiments, hardware resources can be partitioned using information from a configuration file that a system administrator can provide. The hardware resources are allocated to various virtual machines at 305. According to various embodiments, the hardware resources include processors having one or more privileged states. An address translation unit such as a memory mapper or a memory management unit (MMU) is also included to allow regions of memory to be protected from access by non-privileged programs.

In one example, each file server client can be allocated a single processor and a portion of memory. A file server operating system image is booted at 307. It should be noted that although the file server may be a virtual machine coupled to the virtual machine executive, the file server can be located in a variety of locations. In one embodiment, the file server can be located in a separate, remote machine. According to various embodiments, a stateless file server protocol is used to allow file servers and clients to fail and recover independently. According to other embodiments, a transaction-oriented file system could also be used. Any file system that does not have a single point of failure can be used. The file server can be implemented using persistent storage such as redundant arrays of independent disks (RAIDs).

File server client operating system images are then started at 309. Booting a file server before booting file server clients allows clients to acquire boot information from the file server. For example, the operating system used on a particular file server client may only be accessible through the file server. The file server can provide the file server clients with information for a successful boot. At 311, a network is provided to allow the multiple operating systems instances to communicate. In one example, a physical network is provided. In another example, a virtual network is provided by the virtual machine executive. At 313, it is determined if administration of any of the file server clients is needed. For example, an application may need to be reinstalled on the file server clients or a particular client may have failed. The virtual machine executive is used to administer the various clients. In one embodiment, a file server client is rebooted on the virtual machine executive system while all the other file server clients are not affected. In one embodiment, the other file server clients are not affected even though the underlying hardware may be that of a single computer system with a single address space.

Figure 4:
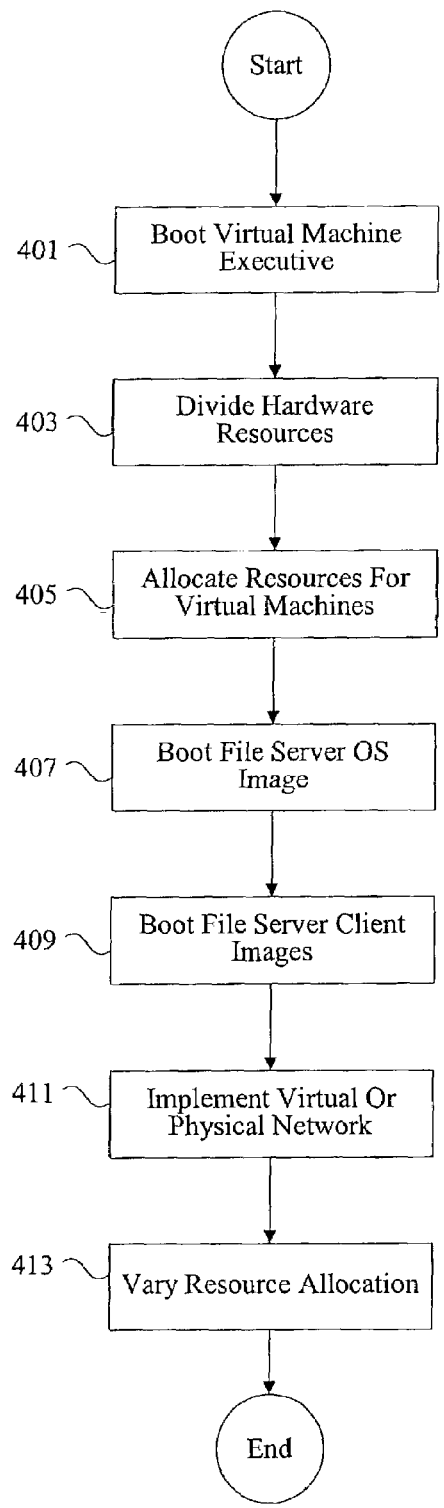
FIG. 4 is a process flow diagram showing a method for launching a multiple user system.

FIG. 4 is a process flow diagram showing the implementation of a virtual machine executive for dynamically allocating resources. At 401, the virtual machine executive can be booted using information from memory such as ROM. The virtual machine executive at 403 can then divide hardware resources. According to various embodiments, hardware resources can be partitioned using information from a configuration file that a system administrator can provide. Many forms of resource management policy are possible. For example, system resources can be partitioned evenly or in a predetermined configuration coded into the virtual machine executive. For systems using file servers and file server clients, more resources can be allocated to a file server. However, it should be understood that resource allocation policies can be very situation specific. In one example, resources can be allocated based on the following formula:

$$2x_0+x_1+x_2+x_3+x_4+?+x_n=100\%;$$

where n=number of file server clients;

$2x_0$=percentage of resources allocated to the file server.

In a situation where the file server clients run very computationally intensive applications without frequently accessing a file server, resources can be allocated based on the following formula:

$$x_0+x_1+x_2+x_3+x_4+?+x_n=100\%;$$

where n=number of file server clients;

$x_0$=percentage of resources allocated to the file server.

It should be noted that file server access may not be as frequent in applications where a file server client performs extensive computation on a given block of data. In one example, frequent file server access may not be necessary in Fast Fourier Transform calculations or when a file server client has ample local memory or even a local disk for swap space. It should be noted that even when a file server client has a local disk for swap space, the file server client is still referred to herein as a diskless client or a dataless client.

The hardware resources can be allocated to various virtual machines at 405. In one example, each file server client can be allocated a single processor and a block of memory. In other examples, however, each file server client may be allocated a percentage use of a single processor. A file server operating system image can be booted at 407. It should be noted that although the file server may be a virtual machine coupled to the virtual machine executive, the file server can be located in a variety of locations. In one embodiment, the file server can be located in a separate, remote machine. File server client operating system images can then be started at 409. Booting a file server before booting file server clients allows clients to acquire boot information from the file server. For example, the operating system used on a particular file server client may only be accessible through the file server. The file server can provide the file server clients with information for a successful boot. At 411, a network can be provided to allow the multiple operating systems instances to communicate. In one example, a physical network is provided. In another example, a virtual network is provided by the virtual machine executive. At 413, resources are allocated.

Figure 5:
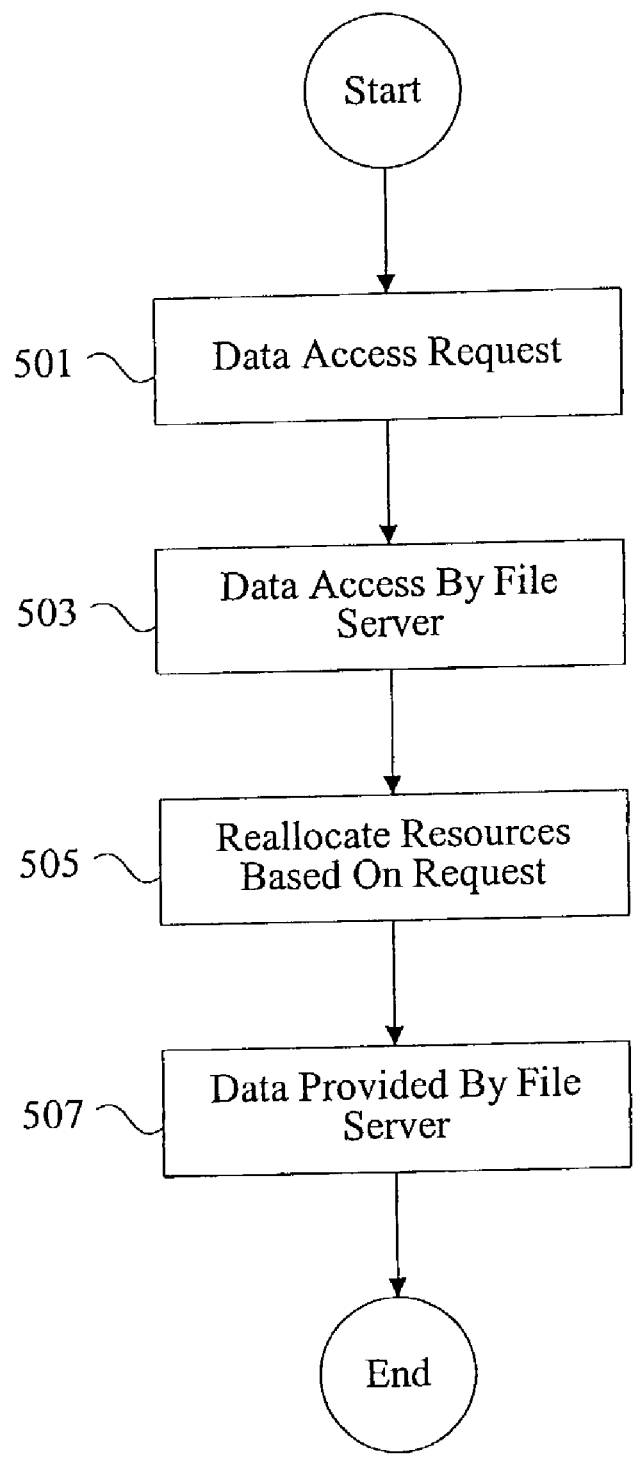
FIG. 5 is a process flow diagram depicting resource allocation based on data access requests.

The virtual machine executive can dynamically vary resource allocation depending on various factors such as demand, load, and priority, as determined by the resource management policies it chooses to implement. FIG. 5 is a process flow diagram showing one example of a virtual machine executive varying resource allocation based on the data access demands. When a particular client operating system continuously accesses data on a file server, it is likely that the particular client operating system could use additional processing and memory resources. In one example, a diskless operating system may not have access to a swap file. Without a swap file, frequent data access requests such as reads and writes would be made through a network file server. Data access requests to a network file server can provide a good indication of whether more or fewer resources are needed to meet the goals of the resource management policy. At 501, a data access request occurs. At 503, the file server accesses the data from persistent memory such as disk. At 505, resources for the various operating systems associated with virtual machines can be reallocated based on the requests or frequency of the requests. In one example, a single request from a diskless operating system leads to the allocation of a larger memory block for the diskless operating system.

After receiving a number of requests from the diskless operating system, additional resources including processing resources can be allocated. According to various embodiments, the network file server can provide an indication to the virtual machine executive what percentage of requests are coming from which file server clients. Based on the distribution and spread of the data requests, a resource management policy that favors utilization would cause the virtual machine executive to partition physical resources using the same percentages. For example, a network file server and may be receiving 50 percent of its requests from a first virtual machine and 25 percent of its requests from a second and a third virtual machine. The virtual machine executive can then dynamically allocate a large portion of the resources to the first virtual machine. The second and third virtual machines may get a share of a single processor and a single memory block.

One example of an equation for dynamically distributing processors or processor time based on the number of requests is the following:

$$p_n=(r_n/r_t)*(p_t-p_s); \text{ where}$$

$r_n$=the number of requests from the nth file server client;
$r_t$=the total number of requests from all file server clients;
$p_n$=the number of processors allocated to the nth file server client;
$p_t$=the total number of processors;
$p_s$=the number of processors allocated to the file server;

Similarly, an example of an equation for dynamically distributing memory blocks based on the number of requests is the following:

$$m_n=(r_n/r_t)*(m_t-m_s); \text{ where}$$

$r_n$=the number of requests from the nth file server client;
$r_t$=the total number of requests from all file server clients;
$m_n$=the amount of memory allocated to the nth file server client;
$m_t$=the total amount of memory;
$m_s$=the amount of memory allocated to the file server.

Although only a few embodiments of the present invention have been described, it should be understood that the present invention may be embodied in many other specific forms without departing from the spirit or the scope of the present invention. It should also be noted that the equations used allocate resources can be varied based on specific hardware configurations and resource management policies. For example, an information retrieval intensive system such as a library database accessed through terminals may have a vast majority of its resources allocated to a file server. The file server may be able to access files on a disk local to a system or access data on an external data warehouses or server farms.

Therefore, the present examples are to be considered as illustrative and not restrictive, and the invention is not to be limited to the details given herein, but may be modified within the scope of the appended claims.

What is claimed is:

1. A computer system, comprising:
a virtual machine executive running on resources including a processor, memory, and persistent storage, the virtual machine executive configured to allocate resources for a plurality of virtual machines, wherein the allocated resources are used to manage multiple services and multiple users in a multiprocessing computer system;
a first operating system created by the virtual machine executive, the first operating system operating as a file server;
a second operating system created by the virtual machine executive, the second operating system operating as a file server client, wherein the second operating system accesses data in persistent storage through the first operating system, wherein processors are allocated based on the ratio of the number of data requests from the file server client to a total number of requests, multiplied by the difference between the total number of processors and the number of processors allocated to the file server.

2. The computer system of claim 1, wherein the first operating system runs on a first virtual machine partitioned by the virtual machine executive.

3. The computer system of claim 1, wherein the second operating system runs on a second virtual machine partitioned by the virtual machine executive.

4. The computer system of claim 1, wherein the first virtual machine is diskless.

5. The computer system of claim 1, wherein the second operating system maintains coherency through the first operating system.

6. The computer system of claim 1, wherein resources further include a plurality of processors and network interfaces.

7. The computer System of claim 1, wherein the first and second operating systems share a single memory space.

8. The computer system of claim 1, wherein the first operating system tracks the number of data access requests.

9. The computer system of claim 8, wherein the virtual machine executive uses the number of data access requests to allocate resources.

10. The computer system of claim 9, wherein resources are allocated based on the number of data access requests from a first operating system and the total data access requests from all supported operating systems.

* * * * *

UNITED STATES PATENT AND TRADEMARK OFFICE
CERTIFICATE OF CORRECTION

PATENT NO. : 7,158,972 B2 Page 1 of 1
APPLICATION NO. : 10/302008
DATED : January 2, 2007
INVENTOR(S) : Timothy Marsland It is certified that error appears in the above-identified patent and that said Letters Patent is hereby corrected as shown below:

On title page
Item 56
First Page Col. 2 (Other Publications); Line 3; Delete "Encyclopeida Brittanica" and insert -- Encyclopeida Britanica --, therefor.

Item 56
First Page Col. 2 (Other Publications); Line 9; Delete "(SOS'99)" and insert -- (SOSP'99) --, therefor.

Item 56
First Page Col. 2 (Other Publications); Line 12; Delete "Perfomance" and insert -- Performance --, therefor.

Column 10; Line 42; In Claim 7, delete "System" and insert -- system --, therefor.

Signed and Sealed this

Seventeenth Day of April, 2007

JON W. DUDAS
*Director of the United States Patent and Trademark Office*